United States Patent [19]

Schmidt et al.

[11] 4,246,104

[45] Jan. 20, 1981

[54] PRESSURE-HYDROLYTIC TREATMENT OF EFFLUENT

[75] Inventors: Friedrich Schmidt; Kurt Mack; Hans-Rolf Furtwängler, all of Wuppertal, Fed. Rep. of Germany

[73] Assignee: Bayer Aktiengesellschaft, Leverkusen, Fed. Rep. of Germany

[21] Appl. No.: 34,713

[22] Filed: Apr. 30, 1979

Related U.S. Application Data

[63] Continuation of Ser. No. 914,815, Jun. 12, 1978, abandoned, which is a continuation of Ser. No. 742,314, Nov. 29, 1975, abandoned.

[30] Foreign Application Priority Data

Nov. 29, 1975 [DE] Fed. Rep. of Germany ....... 2553840

[51] Int. Cl.³ .............................................. C02F 1/72
[52] U.S. Cl. .................................... 210/759; 210/763; 210/906; 210/766
[58] Field of Search ...................... 210/18, 39, 40, 50, 210/59, 62, 63 R, 71, DIG. 28, DIG. 29, DIG. 31

[56] References Cited

U.S. PATENT DOCUMENTS

| 3,398,088 | 8/1968 | Okey | 210/DIG. 29 |
|---|---|---|---|
| 3,586,625 | 6/1971 | Cole et al. | 210/DIG. 28 |
| 3,607,738 | 9/1971 | Nelson | 210/18 |
| 3,676,334 | 7/1972 | Zuckerman | 210/18 |
| 3,762,989 | 10/1973 | Timpe | 210/71 |
| 3,817,862 | 1/1974 | Hoke | 210/63 R |
| 3,862,296 | 1/1975 | Dotson | 210/50 |
| 3,945,919 | 3/1976 | Schindewolf | 210/50 |
| 4,013,757 | 3/1977 | Berkowitz | 210/71 |
| 4,042,502 | 8/1977 | Schmidt | 210/71 |
| 4,070,289 | 1/1978 | Akcasa | 210/71 |

FOREIGN PATENT DOCUMENTS 895741 7/1957 United Kingdom ............ 210/DIG. 31

OTHER PUBLICATIONS

Hackh's Chemical Dictionary, Grant, 4th Edition, McGraw Hill, p. 436.
Standard Methods, (13th Edition) 1971, APHA, AWWA, WPCF, pp. 518–524.
Phosphorus Removal, the State of The Art Journal WPCF, May 1969, Nesb. H, 701–713.

Primary Examiner—Ernest G. Therkorn
Attorney, Agent, or Firm—Sprung, Felfe, Horn, Lynch & Kramer

[57] ABSTRACT

A process for the chemical treatment of an effluent containing at least one organic compound selected from the group consisting of an organometallic compound and an organic compound containing at least one of phosphorus, nitrogen and halogen, comprising treating the effluent hydrolytically for about 20 to 200 minutes at a temperature above about 100° C. under a pressure above about 2 bars and a pH of about 1 to 14. Advantageously, a catalyst comprising activated carbon or kieselguhr is added to the effluent before the hydrolytic treatment and the hydrolytic treatment is carried out in the presence of ammonia or a primary or secondary amine. The organic compound may be an acid ester, a dye, or quaternary ammonium compound, a cyanide, a nitrile, a cyanate, an isocyanate, hydrazine, an organic derivative of hydrazine, an azo compound or an organometallic compound and the effluent may be after-treated as with hypochlorite or $H_2O_2$.

8 Claims, No Drawings

PRESSURE-HYDROLYTIC TREATMENT OF EFFLUENT

This is a continuation of application Ser. No. 914,815, filed June 12, 1978 now abandoned, which is a continuation of Ser. No. 742,314 filed Nov. 29, 1975, now abandoned.

For operating a biological effluent treatment plant, the quantity of oxygen required for the metabolism of the microorganisms has to be delivered to the activated sludge basin and a certain concentration of oxygen must be maintained to ensure that the cultivation of bacteria takes place aerobically. The quantity of oxygen required for this purpose is delivered to the liquid from the gaseous phase. Since effluents from the chemical industry generally contain a large number of chemical compounds with a variety of different properties, it is important to ensure that compounds capable of inhibiting or completely preventing the biodegradation process do not enter the treatment stage. For this reason, the effluents are suitably monitored before entering the "biological stage" and if necessary are delivered to special collecting basins so that they may subsequently be subjected to a special physical or chemical pretreatment. In general, the chemical pretreatment of effluent is carried out by treatment with oxidizing agents such as hypochlorite or hydrogen peroxide for example (German Offenlegungsschrift No. 2,352,856). The object of this known treatment is to oxidize organic compounds in particular to such an extent that harmless inorganic compounds, such as carbonic acid, sulfate or nitrogen are formed. In cases where this mineralization cannot be achieved, the undesirable substances should be chemically modified to an extent such that they no longer have any harmful properties and, accordingly, may be discharged into the main drainage system. Chemical methods for the pretreatment of effluent also include the conversion of undesirable soluble compounds by suitable chemical reaction into water-insoluble substances which in turn may be removed from the effluent, for example by filtration or extraction. In this way, copper, for example, may be deposited and separated off in the form of substantially insoluble sulfide by precipitation with hydrogen sulfide.

The disadvantages of conventional effluent treatment processes are an increase in the salt load and the formation of undesirable oxidation products (for example by hypochlorite) or high costs in cases where expensive chemicals, apparatus or energy are used.

The object of the present invention is to provide a simple treatment or pretreatment process, more especially for organic chlorine-containing and/or nitrogen-containing and/or phosphorus-containing and/or metal-containing effluents, in which an effluent is formed which may either be directly discharged as such or may be biologically degraded with particularly good effect.

Accordingly, the present invention provides a process for the chemical treatment or pretreatment of effluents containing inner alia phosphorus and/or nitrogen and/or halogen compounds and/or organometallic compounds, characterized by the fact that the effluents are subjected to a pressure-hydrolytic treatment lasting about 20 to 200 minutes, preferably about 100 to 150 minutes, at temperatures above about 100° C., preferably at temperatures of about 170° to 210° C., under pressures above about 2 bars absolute, preferably under pressures of about 20 to 30 bars and at pH-values in the range from about 1 to 14 and preferably at pH-values of about 9 to 14.

In a variant of the process according to the invention, the pressure-hydrolytic treatment of the effluent, especially in cases where it contains organohalogen compounds, is carried out in the presence of ammonia, primary or secondary amines and/or with further addition of catalysts. To this end, approximately 1 to 20 kg and preferably about 2 to 10 kg of nitrogen, in the form of ammonia or an amine or a precursor which liberates ammonia or amine, are added per cubic meter of effluent to be treated. Suitable additives are, in particular, lower aliphatic or aromatic compounds, e.g. lower alkyl- and/or phenyl-containing amines. Some of the additives suitable for use in the process according to the invention are mentioned by way of example in the following: ammonia, monomethylamine, hydrazine and urea.

According to the invention, the preferred additive is ammonia.

The "pressure hydrolysis" process in the presence of ammonia and/or an amine is preferably carried out with an approximately two-fold to three-fold equimolar excess, based on the concentration of halogen (organically bound halogen).

In another embodiment of the process according to the invention, catalysts, preferably activated carbon or kieselguhr, may be added to the effluent before the pressure-hydrolytic treatment. The catalysts are used in quantities of from about 0.1 to 10 kg and preferably in quantities of from about 1 to 5 kg per cubic meter of effluent to be treated. In another embodiment of the process according to the invention, the pressure-hydrolytic treatment of the effluent according to the invention may be followed, before biological degradation in the activated sludge basin, by a known chemical aftertreatment, for example with sodium hypochlorite or hydrogen peroxide, resulting in the formation of an effluent which may then be biologically degraded with particularly good effect, as shown by the fact that the ratio of $COD/BOD_5$ approaches the value 1. Hypochlorite or $H_2O$ may be used in the known concentrations of about 10 to 1000 g/l of effluent to be treated.

The process according to the invention is particularly suitable for the treatment of phosphorus-containing and/or nitrogen-containing and/or halogen-containing compounds and/or organometallic compounds which are derived, for example in the form of their esters, from the acids of phosphorus and hydrohalic acids. Organic dyes or heterocyclic compounds can also be modified by pressure hydrolysis. This applies in particular to hydrocyanic acid, which is known to pollute effluents, and its derivatives such as nitriles, cyanides or the CN-compounds present in the form of metal complexes, such as potassium cyanoferrate-II and -III. The following compounds are mentioned as examples:

Of CN-compounds: potassium cyanide, sodium cyanide, potassium cyanoferrate-II and -III, benzyl cyanide, phenyl glyoxylonitrile oxime; of halogen compounds: methylene chloride, chloroform, ethylene chloride, trichlorethylene, mono-, di- and tri-chloroacetic acid, chlorobenzene, dichlorobenzene, bromobenzene, polychlorinated biphenyls, hexachlorocyclohexane, mono-, di-, tri-, tetra- and penta-chlorophenols; of esters and semi-esters of mineral acids (acids of phosphorus, mono- and di-thiophosphoric acids, nitric acid, nitrous acid): mono, di- and trimethyl thiophosphoric acid, dimethyldithiophosphoric acid, methyl phosphoric acid, ethyl phosphoric acid; of esters of carboxylic acids; 1-trichloro-2-m,p-dichlorophenylethyl acetic ester; of thioethers: 2-oxydiethylthioether; of heterocyclic compounds: 3-methylol-4-oxo-1,2,3-benzotriazole, 3-chloro-4-methyl-7-oxycoumarin; of quaternary ammonium compounds: dimethyl benzyldodecyl ammonium chloride, of organometallic compounds: tricyclohexyl-1,2,4-triazolyl tin; of dyes (nomenclature according to Colour Index=C.I.) Isolangrau K-BRLS=C.I. Acid Black 140, Chemical Class: monoazo(1:2-metal complex dye): Astrazonrot GTL=C.I. Basis red 18, 11085; Benzaminschwarz DS=C.I. Direct Black 17, 27700; Supracenbraun 3 G=C.I. Acid Brown 248, Chemical Class: nitro; Resolinblau FBL=C.I. Disperse Blue 56, Chemical Class: anthraquinone; Siriuslichtgelb GR-LL=C.I. Direct Yellow 109, Chemical Class: trisazo; Lavafixbrillantrot E4B=C.I. Reactive Red 40, Chemical Class: monoazo: Indanthrenbraun BR-M=C.I. Vat Brown 1, 70800.

The pressure hydrolytic treatment modifies the effluent in such a way that, depending upon the result obtained, it may readily be discharged without further treatment or may be delivered for example to a biological treatment plant. In the latter case, better biological degradation is obtained by comparison with effluent which has not been treated by pressure hydrolysis.

It is thus possible by the process according to the invention to reduce the chemical oxygen demand (COD) of the effluent by the biological degradation by about 50 to 90% in relation to a process in which the effluent is not pretreated by pressure hydrolysis.

The process according to the invention is suitable for splitting up metal complex compounds of the types known for example as dyes to such an extent that the metals may be separated off by conventional methods (e.g. ion exchange and precipitation).

Chromophoric parts of a molecule can also be modified by the process according to the invention to such an extent that the dye character is eliminated so that the permeability to light of aqueous solutions is considerably increased. Under certain conditions, this can also produce an improvement in the living conditions in waters without reducing the COD/BOD values.

The process according to the invention may be carried out in known apparatus suitable for pressure-hydrolytic treatments, for example stirrer-equipped vessels, autoclaves, pressure tubes, etc.

The process according to the invention may be carried out either continuously or in batches.

The process according to the invention is illustrated by the following Examples:

EXAMPLE 1

315 ml of ammonia water (25%) were added to 6 liters of soda-alkaline effluent which contained inter alia approximately 11 g of dichloroacetic acid. The mixture was treated for 1.5 hours at 200° C. in an autoclave at a pH-value of about 14. A pressure of 16 atms. gauge was spontaneously established.

Whereas the effluent, which originally had not been treated by pressure hydrolysis, could only be biologically degraded to COD-contents of 10 g per liter, a COD content of 3 g per liter of effluent was obtained after biological degradation by the pressure hydrolytic treatment according to the present invention.

EXAMPLE 2

1 liter of a soda-alkaline effluent (pH 14) from the production of dimethyl thiophosphoric acid ester chloride which contained inter alia 7.5 g of dimethyl thiophosphoric acid was treated in an autoclave for 1.5 hours at a temperature of 170° C. A pressure of 13 atms. gauge was spontaneously established.

After degradation, followed by oxidation with hypochlorite, the effluent thus treated had a COD content of 3.8 g per liter compared with the COD content of 7.6 g per liter of an effluent of the same composition which had been pretreated by oxidation with hypochlorite rather than by pressure hydrolysis.

EXAMPLE 3

5 g of sodium cyanide and 1 ml of 45% sodium hydroxide were added to 1 liter of distilled water, followed by treatment under pressure for 2 hours at 200° C. A pressure of 16 atms. gauge was spontaneously established.

Whereas sodium cyanide is known to act as a poison during the biological degradation process, no more cyanide could be detected in the solution treated by pressure hydrolysis. By contrast, the detection of ammonia proved positive. The treated solution does not act as a poison on the activated sludge of a biological treatment plant.

EXAMPLE 4

Following the addition of 5 g of potassium hexacyanoferrate-III and 12 g of sodium hydroxide, 1 liter of distilled water was treated for 2 hours at 200° C. A pressure of 18 atms. gauge was spontaneously established.

In the sample treated by pressure hydrolysis, the Berliner Blau-reaction was negative; instead ammonia could be detected.

Under the same conditions, the same results were also obtained with potassium hexacyanoferrate-II.

EXAMPLE 5

1 liter of effluent which contained approximately 10 g of ethylene chloride and 17.6 g of sodium hydroxide was subjected to a pressure treatment for 2 hours at 200° C., a pressure of 20 atms. gauge being spontaneously established.

This effluent showed the following analysis in relation to an effluent which had not been pretreated by pressure hydrolysis: ethylene chloride: 7.0 ppm, ionogenic chlorine: 4.86 g/l.

EXAMPLE 6

1 liter of water which contained 5 g of chlorobenzene was pressure-treated for 2 hours at 200° C. with 4 g of sodium hydroxide in the presence of 1 g of active carbon, a pressure of approximately 20 atms. gauge being spontaneously established.

After the treatment, the mixture was homogeneous and only contained 105.6 mg of chlorobenzene/l. The increase in ionogenic chlorine amounted to 0.5 g/l.

EXAMPLE 7

Following the addition of 5 g of ethylmercapto ethanol and 16 g of sodium hydroxide, 1 liter of distilled water was treated for 2 hours at 200° C. A pressure of 17 atms. gauge was spontaneously established.

Only 2 g of decomposition products, but not the starting compound, could be detected (by gas chromatography) in the sample treated by pressure hydrolysis.

EXAMPLE 8

Following the addition of 5 g of dimethylbenzene dodecyl ammonium chloride and 8 g of sodium hydroxide, 1 liter of distilled water was treated for 2 hours at 200° C. A pressure of 15 atms. gauge was spontaneously established.

Benzyl alcohol could be detected (by gas chromatography) in the sample treated by pressure hydrolysis. The organic carbon content had fallen from 3.68 g/l to 0.86 g/l. Whereas the unreacted solution completely suppressed the oxygen consumption of an activated sludge in the biological test, the untreated sample did not have any effect upon the consumption of oxygen.

EXAMPLE 9

Following the addition of 9.8 g of 98% sulfuric acid, 1 liter of an effluent containing inter alia 3-methyl-4-oxo-1,2,3-benzotriazole was treated for 2 hours at 200° C. A pressure of 20 atms. gauge was spontaneously established.

In the sample treated by pressure hydrolysis, a polymer had precipitated and could readily be separated off by filtration. The originally dark brown colored sample was only pale yellow. The CSB value had fallen from 64.91 g/l to 24.5 g/l, while the organic carbon content had fallen from 25.98 g/l to 10.39 g/l. In addition, no nitrogen compound could be detected by thin-layer chromatography with the N-[naphthyl-(1)]-ethylene diammonium dichloride reagent.

EXAMPLE 10

Following the addition of 5 g of p-chlorophenoxy-1,2,4-triazolyl methyl tert.-butyl ketone and 8 g of sodium hydroxide, 1 liter of distilled water was treated for 2 hours at 200° C. A pressure of 18 atms. gauge was spontaneously established.

In the sample treated by pressure hydrolysis, it was possible to detect only degradation products by thin layer electrophoresis.

EXAMPLE 11

Following the addition of 5 g of CI Direct Black 17 and 8 g of sodium hydroxide, 1 liter of distilled water was treated for 2 hours at 200° C. A pressure of 15 atms. gauge was spontaneously established.

The complete decomposition of the dye could be detected by thin-layer chromatography (layer: silica gel F 254; eluent butanone: 5 N-ammonia: diethyl amino 80:16:16; detection=natural coloration).

It will be appreciated that the instant specification and examples are set forth by way of illustration and not limitation, and that various modifications and changes may be made without departing from the spirit and scope of the present invention.

What is claimed is:

1. A process for the chemical treatment of an effluent containing organic phosphoric ester acids, comprising treating the effluent hydrolytically for about 20 to 200 minutes at a temperature above about 100° C. under a pressure above about 2 bars and at a pH of about 1 to 14, and thereafter treating the effluent with hydrochlorite or $H_2O_2$.

2. A process as claimed in claim 1, wherein effluent contains an organohalogen compound and the hydrolytic treatment is carried out in the presence of ammonia or a primary or secondary amine.

3. A process as claimed in claim 2, wherein about 1 to 20 kg of nitrogen, in the form of ammonia, amine or precursor thereof, are present per cubic meter of effluent to be treated.

4. A process as claimed in claim 1, wherein a catalyst comprising activated carbon or kieselguhr is added to the effluent before the hydrolytic treatment.

5. A process as claimed in claim 4, wherein about 100 to 10000 g of catalyst is added per cubic meter of effluent to be treated.

6. A process as claimed in claim 5, wherein about 2 to 10 kg of nitrogen, in the form of ammonia, amine or precursor thereof, are present per cubic meter of effluent to be treated, and the effluent is treated for about 100 to 150 minutes at about 170° to 210° C. under a pressure of about 20 to 30 bars and a pH of about 9 to 14, and the effluent is aftertreated with about 10 to 1000 g/l of hypochlorite or $H_2O_2$.

7. A process as claimed in claim 1, wherein the effluent is treated hydrolytically at about 170° to 210° C. in an autoclave under spontaneous pressure.

8. A process as claimed in claim 1, wherein the effluent is neutralized by the addition of acids or alkalis.

* * * * *

UNITED STATES PATENT AND TRADEMARK OFFICE
CERTIFICATE OF CORRECTION

PATENT NO. : 4,246,104
DATED : Jan. 20, 1981
INVENTOR(S) : Friedrich Schmidt et al It is certified that error appears in the above—identified patent and that said Letters Patent is hereby corrected as shown below:

Column 6, line 18, Delete "hydrochlorite" and insert --hypochlorite--.

Signed and Sealed this

Second Day of June 1981

[SEAL]

Attest:

RENE D. TEGTMEYER

Attesting Officer  Acting Commissioner of Patents and Trademarks